United States Patent
Patrick

(10) Patent No.: US 10,267,323 B2
(45) Date of Patent: Apr. 23, 2019

(54) AXIAL BLOWER VACUUM

(71) Applicant: Techtronic Industries Co. Ltd., Kwai Chung (CN)

(72) Inventor: Robert Andrew Patrick, Simpsonville, SC (US)

(73) Assignee: TECHTRONIC INDUSTRIES CO. LTD., Kwai Chung, Hong Kong (CN)

( * ) Notice: Subject to any disclaimer, the term of this patent is extended or adjusted under 35 U.S.C. 154(b) by 263 days.

(21) Appl. No.: 14/988,976

(22) Filed: Jan. 6, 2016

(65) Prior Publication Data

US 2016/0195097 A1    Jul. 7, 2016

Related U.S. Application Data

(60) Provisional application No. 62/100,438, filed on Jan. 6, 2015.

(51) Int. Cl.
| | |
|---|---|
| *A01G 20/47* | (2018.01) |
| *F04D 19/00* | (2006.01) |
| *A01G 20/43* | (2018.01) |
| *F04D 25/08* | (2006.01) |
| *F04D 29/54* | (2006.01) |

(52) U.S. Cl.
CPC .......... *F04D 19/007* (2013.01); *A01G 20/43* (2018.02); *A01G 20/47* (2018.02); *F04D 25/082* (2013.01); *F04D 29/542* (2013.01); *F04D 29/545* (2013.01)

(58) Field of Classification Search
CPC .... F04D 19/007; F04D 25/082; F04D 29/542; F04D 29/545; A01G 1/125; A01G 20/43; A01G 20/47; A47L 5/14; A47L 5/36
See application file for complete search history.

(56) References Cited

U.S. PATENT DOCUMENTS

| | | | |
|---|---|---|---|
| 4,597,203 A | 7/1986 | Middleton | |
| 4,773,119 A | 9/1988 | Duthie et al. | |
| 4,945,604 A * | 8/1990 | Miner | A47L 5/14 15/344 |

(Continued)

FOREIGN PATENT DOCUMENTS

| | | |
|---|---|---|
| CA | 2127524 | 1/1995 |
| CA | 101260833 | 9/2008 |

(Continued)

OTHER PUBLICATIONS

European Search Report for Application No. 16150343.8 dated Aug. 29, 2016 (1 page).

*Primary Examiner* — Robert J Scruggs
(74) *Attorney, Agent, or Firm* — Michael Best & Friedrich LLP

(57) ABSTRACT

A blower vacuum includes a housing having a wall that extends between a first opening and a second opening, and a fan positioned at least partially within the housing and rotatable about a fan axis that extends between the first opening and the second opening. A motor is positioned outside of the housing and is rotatable about a motor axis that is offset from the fan axis. The motor is operable in a first direction to rotate the fan in a first direction to produce an air flow from the first opening to the second opening and operable in a second direction to rotate the fan in a second direction to produce an air flow from the second opening to the first opening.

13 Claims, 6 Drawing Sheets

(56) References Cited

U.S. PATENT DOCUMENTS

| | | | |
|---|---|---|---|
| 5,267,371 A * | 12/1993 | Soler | A47L 5/36 |
| | | | 15/327.5 |
| 5,383,427 A | 1/1995 | Tuggle et al. | |
| 5,511,281 A * | 4/1996 | Webster | A47L 5/14 |
| | | | 15/330 |
| 5,768,749 A | 6/1998 | Ohi et al. | |
| 5,839,397 A | 11/1998 | Funabashi et al. | |
| 6,305,048 B1 * | 10/2001 | Salisian | A47L 5/36 |
| | | | 15/326 |
| 7,607,244 B2 | 10/2009 | Hishada | |
| 2001/0054212 A1 * | 12/2001 | Walker | A47L 5/24 |
| | | | 15/350 |
| 2006/0182502 A1 | 8/2006 | Schliemann et al. | |
| 2007/0209346 A1 * | 9/2007 | Bovo | A01D 34/90 |
| | | | 56/12.8 |
| 2008/0089785 A1 | 4/2008 | Schliemann et al. | |
| 2008/0141541 A1 | 6/2008 | Hurley | |
| 2014/0021203 A1 | 2/2014 | Miefalk et al. | |

FOREIGN PATENT DOCUMENTS

| | | |
|---|---|---|
| CA | 2825035 | 8/2012 |
| CA | 2825601 | 8/2012 |
| CA | 2825685 | 8/2012 |
| CA | 2825686 | 8/2012 |
| DE | 3812105 | 9/1988 |
| DE | 8815616 | 2/1989 |
| EP | 0821872 | 2/1998 |
| EP | 2617281 | 4/2013 |
| GB | 958481 | 5/1964 |
| WO | 2011097157 | 8/2011 |

* cited by examiner

AXIAL BLOWER VACUUM

BACKGROUND

The present invention relates to axial blower vacuums (vacs), and more particularly to an axial blower vacuum with a motor radially off-set from a fan blade assembly.

Axial blower vacuums are typically constructed with a motor in-line with a fan blade assembly. This assembly design allows for a thinner and sometimes smaller construction. However, this design also obstructs the flow of air from an inlet to an outlet because the air is forced through the motor assembly. By placing a motor assembly off-set from the fan blade assembly, the flow of air is generally smoother, cleaner, and traveling at a higher speed when compared to a similarly powered inline motor assembly.

SUMMARY

In one construction, the invention provides a blower vacuum that includes a housing including a wall that extends between a first opening and a second opening, and a fan positioned at least partially within the housing and rotatable about a fan axis that extends between the first opening and the second opening. A motor is positioned outside of the housing and is rotatable about a motor axis that is offset from the fan axis. The motor is operable in a first direction to rotate the fan in a first direction to produce an air flow from the first opening to the second opening and operable in a second direction to rotate the fan in a second direction to produce an air flow from the second opening to the first opening.

In another construction, the invention provides a blower vacuum that includes an elongated housing having an outer wall that extends between a first opening and a second opening. The outer wall defines a housing interior and a housing exterior. A fan includes a first stage and a second stage. The fan is positioned at least partially within the housing interior and is rotatable about a fan axis that extends between the first opening and the second opening. A motor is positioned in the housing exterior and is rotatable about a motor axis that is offset from the fan axis. The motor is operable in a first direction to rotate the fan in a first direction to produce an air flow from the first opening to the second opening and is operable in a second direction to rotate the fan in a second direction to produce an air flow from the second opening to the first opening.

In yet another construction, a blower vacuum includes an elongated housing having an outer wall that extends between a first opening and a second opening, the outer wall defining a housing interior and a housing exterior. A fan includes a plurality of interior fan blades and a plurality of exterior fan blades, the fan positioned at least partially within the housing interior and rotatable about a fan axis that extends between the first opening and the second opening. A motor is positioned in the housing interior and is rotatable about the fan axis. The motor is operable in a first direction to rotate the fan in a first direction to produce an air flow from the first opening to the second opening and is operable in a second direction to rotate the fan in a second direction to produce an air flow from the second opening to the first opening. Operation of the motor in a first direction produces a first air stream that passes through the motor and a second separate air stream that passes outside of the motor.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
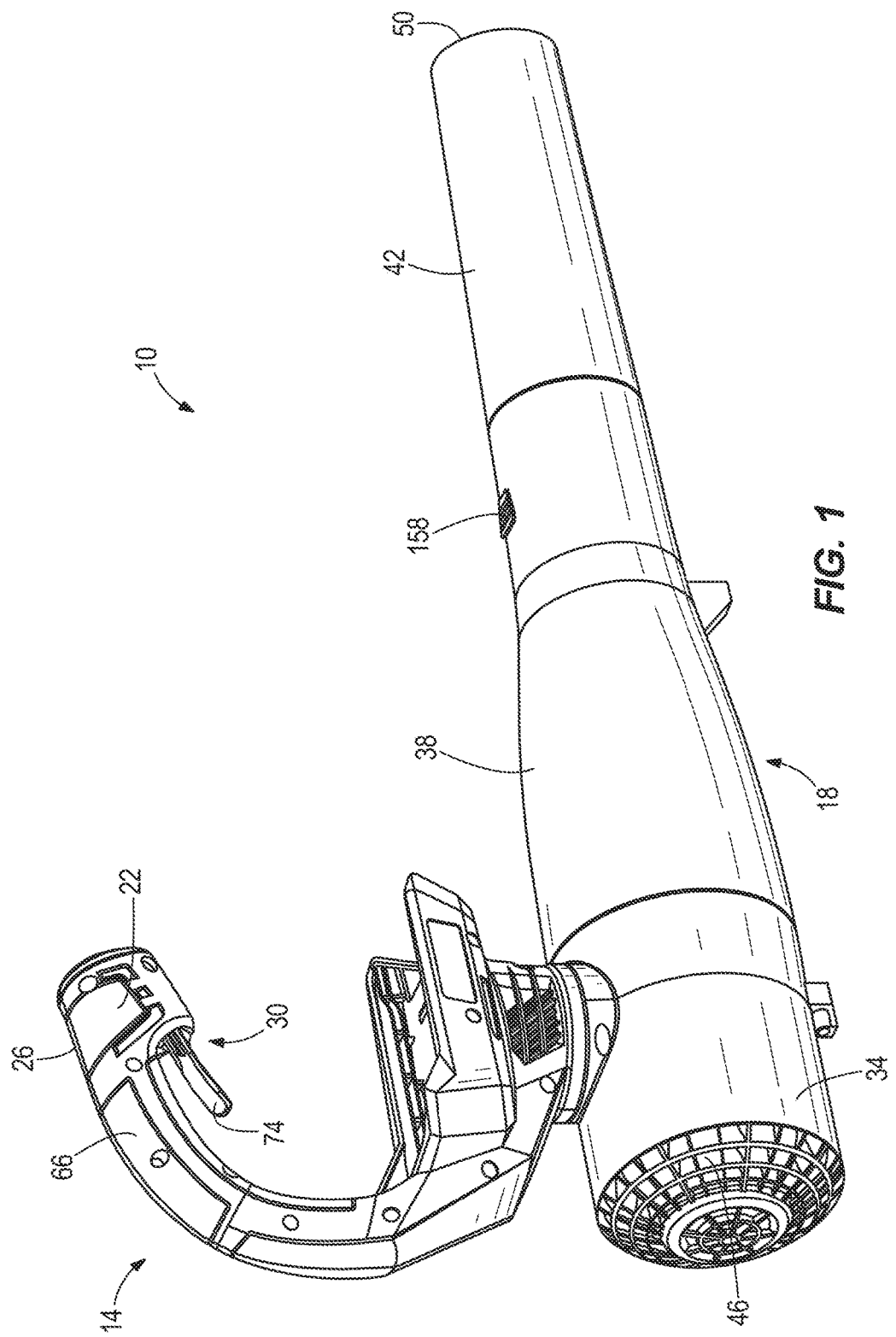
FIG. 1 is a perspective view of an axial blower vacuum according to one construction of the invention.

FIG. 1 illustrates one construction of an axial blower vacuum 10, such as a leaf blower vac. The axial blower vacuum 10 includes a C-shaped handle assembly 14 and a generally in-line blower vacuum assembly 18 that is coupled to the handle assembly 14. The handle assembly 14 includes a right handle portion 22, a left handle portion 26 joined to the right handle portion 22, and a trigger assembly 30 between the right handle portion 22 and the left handle portion 26. The blower vacuum assembly 18 includes an inlet housing 34, an outlet housing 38, and a nozzle 42. When blowing, the blower vacuum assembly 18 is configured to direct air from an inlet opening 46 on the inlet housing 34 to an exhaust opening 50 on the nozzle 42. When vacuuming, the blower vacuum assembly 18 is configured to direct air from the exhaust opening 50 to the inlet opening 46.

Figure 2:
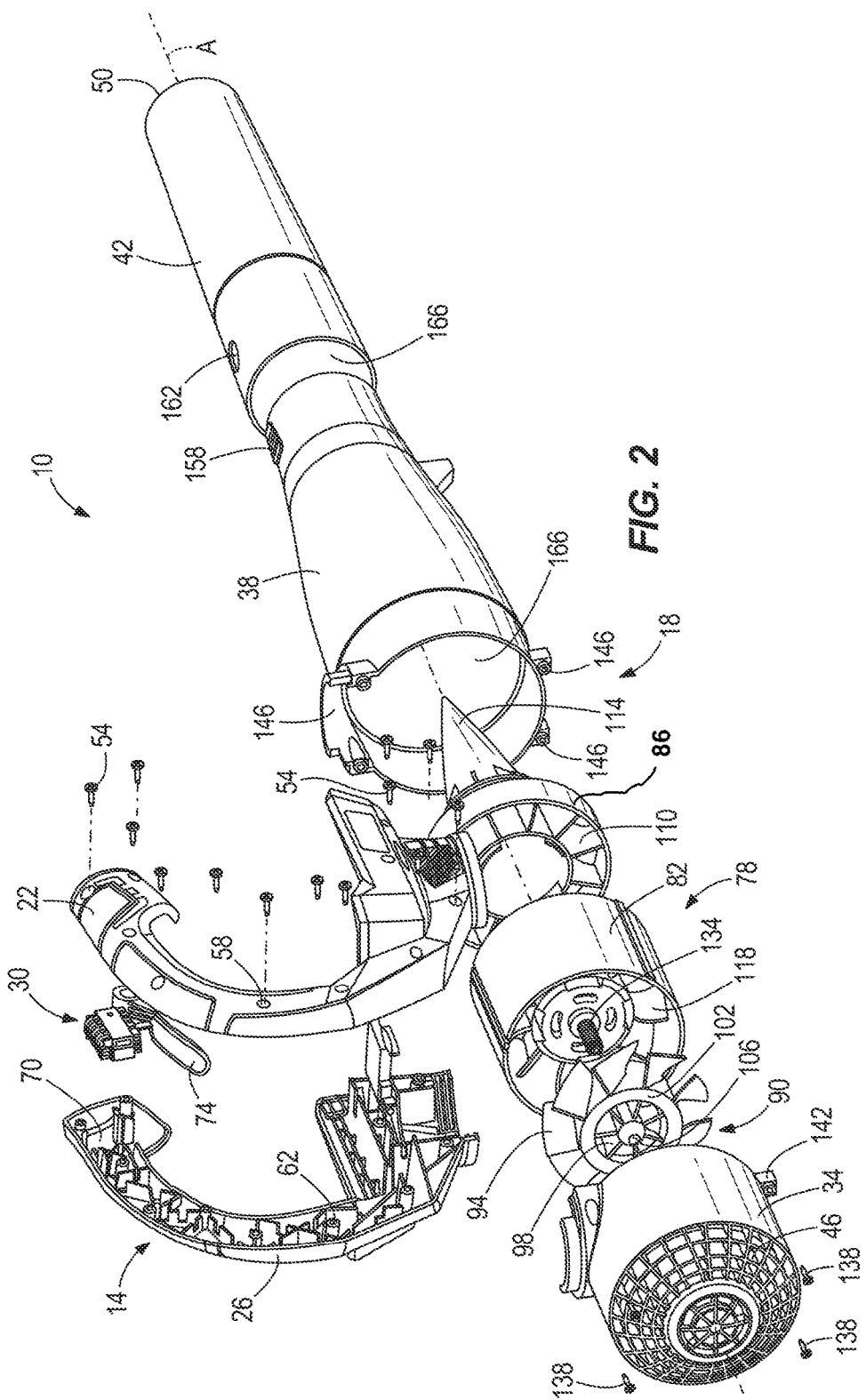
FIG. 2 is an exploded, perspective view of the axial blower vacuum of FIG. 1.

Referring now to FIG. 2, the handle assembly 14 further includes screws 54 for connecting the right handle portion 22 to the left handle portion 26. The right handle portion 22 has a plurality of openings 58 throughout, which are capable of threadably engaging the screws 54. The screws 54 extend through the openings 58 in the right handle portion 22 to threadably engage elements 62 within the left handle portion 26. When the screws 54 are tightened, e.g., the right handle portion 22 and left handle portion 26 assembled, the right handle portion 22 and the left handle portion 26 are capable of creating a generally uniform and comfortable gripping portion 66 on the exterior of the handle assembly 14.

A recess 70 is formed within the interior of the right handle portion 22 and the left handle portion 26. Specifically, the recess 70 is at an end portion of the handle assembly 14 and proximate to the gripping portion 66. Further, the recess 70 is adapted to fit the trigger assembly 30. The trigger assembly 30 includes a trigger 74 biased in an open position by a spring, but capable of being actuated about a pivot point. In other constructions, the trigger 74 may be slidably actuated.

Figure 3:
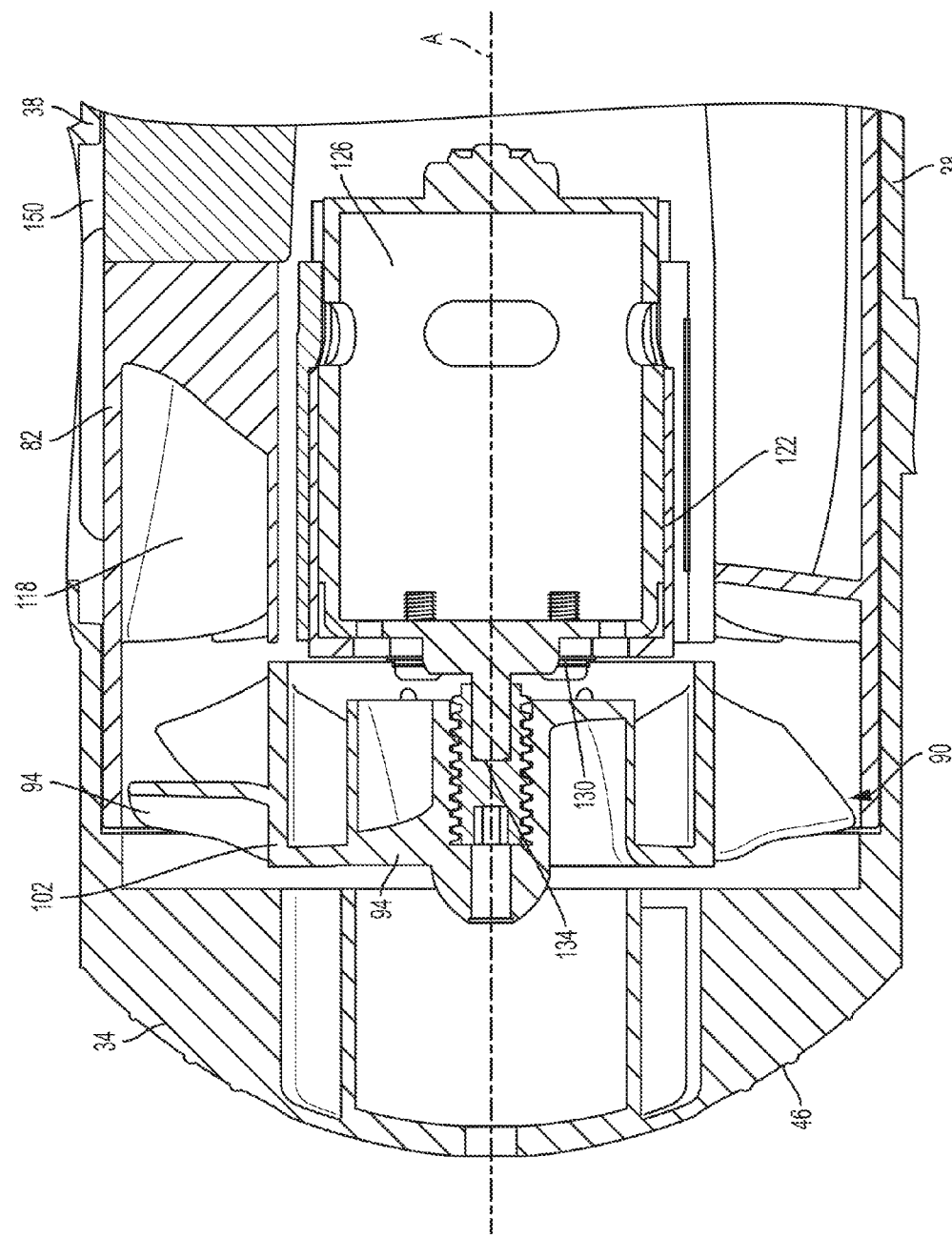
FIG. 3 is a partial, side view of a fan assembly of the axial blower vacuum of FIG. 1.

Referring to FIG. 2, the axial blower vacuum 10 further includes a fan assembly 78 assembled in the interior of the blower vacuum assembly 18. The fan assembly 78 includes a guide vane housing 82, a tail cone 86, and a fan 90 coupled to the guide vane housing 82. As illustrated in FIG. 3, the fan 90 includes a plurality of exterior fan blades 94, a plurality of interior fan blades 98 that are radially separated by a partition 102 from the exterior fan blades 94, and a cavity 106 at the center of the fan 90. The tail cone 86 includes ribs 110 (shown in FIG. 2) and an end point 114 that extends toward the exhaust opening 50. The guide vane housing 82 includes guide vanes 118 radially exterior to an interior motor cavity 122. The motor cavity 122 is shaped to receive a motor 126 for rotating the fan 90. Specifically, the guide vane housing 82 includes a hole 130 at the center of the housing 82 adapted to receive a drive shaft 134 that extends from the motor 126. A longitudinal axis of the drive shaft 134 defines a motor axis A that is coaxial with a fan blade axis A. Further, the drive shaft 134 is shaped to engage the cavity 106 at the center of the fan 90.

Figure 4:
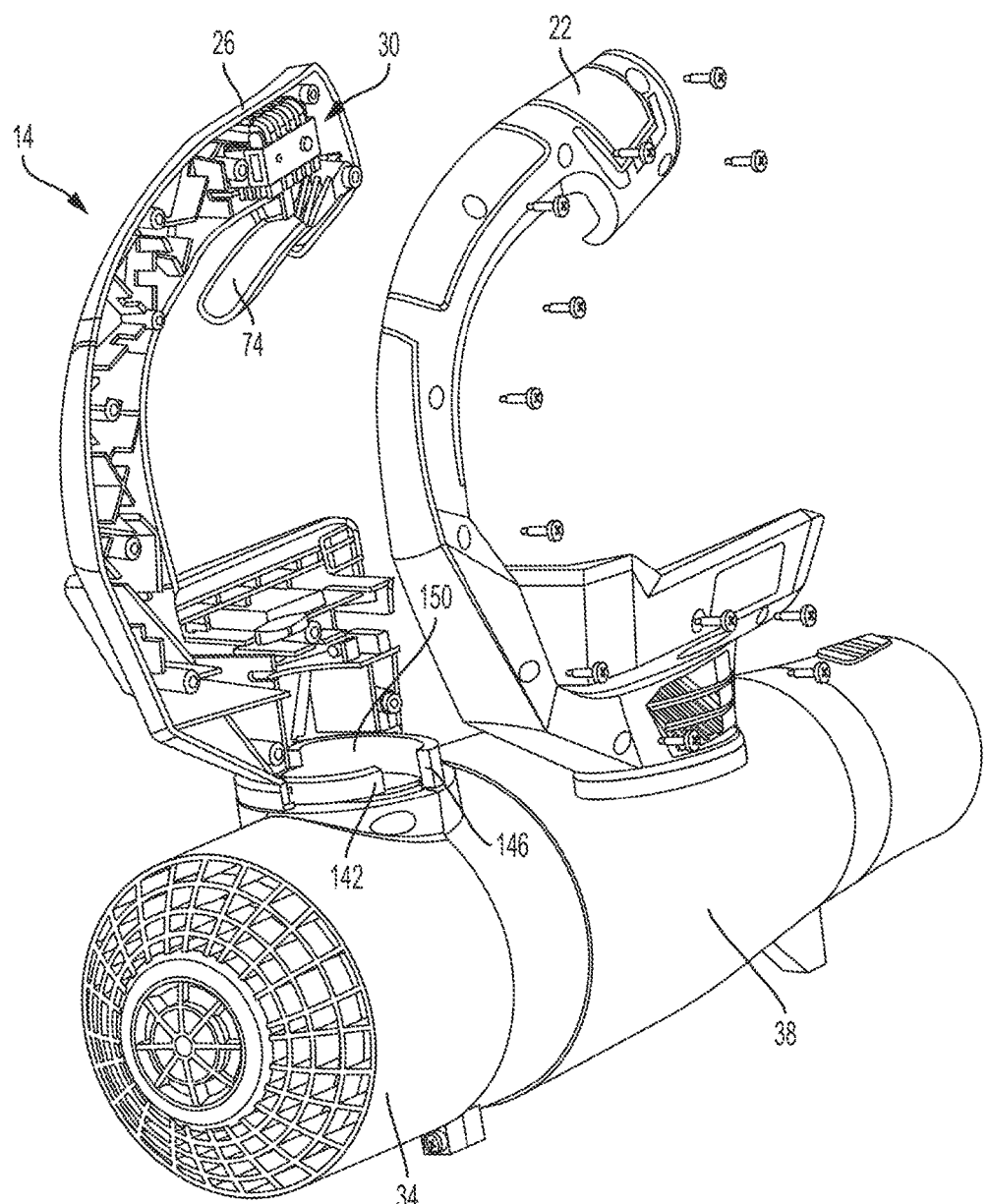
FIG. 4 is an exploded, perspective view of a handle assembly of the axial blower vacuum of FIG. 1

Further referring to FIG. 2, the blower vacuum assembly 18 includes screws 138 for connecting the inlet housing 34 and the outlet housing 38. The inlet housing 34 has outlet mating portions 142 on opposite sides of an exterior of the housing 34. The outlet mating portions 142 being adapted to receive the screws 138 therethrough. Similar to the handle screws 54, the blower vacuum screws 138 extend through the outlet mating portions 142 to threadably engage inlet mating portions 146 disposed on the outlet housing 38. The inlet mating portions 146 and the outlet mating portions 142, when coupled, create a circular opening 150 on a side of the blower vacuum assembly 18, as shown in FIG. 4. The inlet mating portions 146 and the outlet mating portions 142 create a flange portion that is capable of coupling with the bottom portion of the handle assembly 14.

The circular opening 150 allows for an electrical connection between the trigger assembly 30 and the motor 126. The trigger assembly 30 includes a switch that, when closed through actuation of the trigger 74, allows power to reach the motor 126. When energized, the motor 126 rotates the drive shaft 134, which in turn, rotates the fan 90 and the fan blades 94, 98 creating a forced air flow 170. In one construction, the power may be generated through an internally housed battery. While in another construction, the power may be generated from an AC source, or alternatively an externally mounted battery such as a power tool battery.

The outlet housing 38 further includes a projection 158 for mating the outlet housing 38 and the nozzle 42 at a mating section. The projection 158 is disposed toward the exhaust opening 50 of the nozzle 42 to minimize overlapping of the outlet housing 38 and the nozzle 42. An opening 162, shaped for fitting the projection 158 therethrough, is disposed on the nozzle 42. The diameter of the outlet housing 38 is less than the diameter of the nozzle 42 at the mating section, when excluding the projection 158, so that the nozzle 42 can be placed within the outlet housing 38. The projection 158 creates a portion of the outlet housing 38 with a greater diameter than that of the nozzle 42 at the mating section. The projection 158 is shaped to create a naturally biased extension through the opening 162. Therefore, when pressed together, the projection 158 couples the outlet housing 38 to the nozzle 42, which can be uncoupled by depressing the projection 158 below the opening.

Further referring to FIG. 2, the blower vacuum assembly 18 defines a passageway 166 on an interior of the inlet housing 34, the outlet housing 38, and the nozzle 42. The passageway 166 is configured to direct the forced air flow 170 from the inlet 46 to the exhaust 50. During rotation, the fan blades 94, 98 direct air from a low pressure region, at or near the inlet 46 while blowing, to a high pressure region, at or near the exhaust opening 50. The passageway 166 is specifically shaped to direct and increase the speed of the air flow 170.

Figure 5:
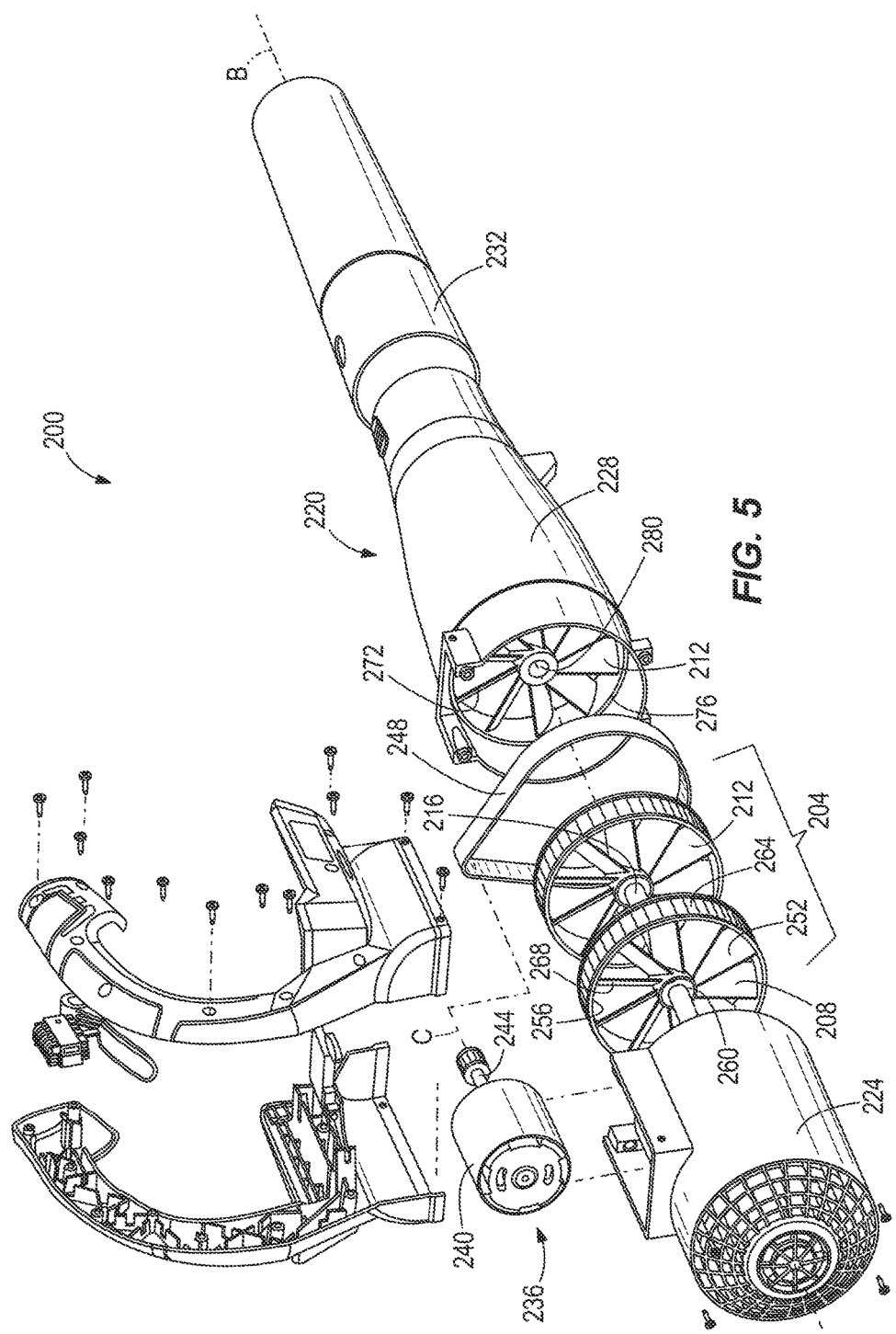
FIG. 5 is a partial, perspective view of an axial blower vacuum according to a second construction of the invention.

Referring now to FIG. 5, a second construction of an axial blower vacuum 200 is illustrated. The axial blower vacuum 200 is similar to the axial blower vacuum 100 with only the differences being described.

The axial blower vacuum 200 includes, a dual-fan assembly 204 having a first fan 208, a second fan 212, and a spindle 216 that couples the first fan 208 and the second fan 212 at opposite longitudinal ends of the spindle 216. The second fan 212 is illustrated in both an exploded position and an operating position in FIG. 5 The dual-fan assembly 204 is positioned within the inlet housing 34 and the outlet housing 38 much like the fan assembly 78 of FIGS. 1 and 2.

The longitudinal axis of the fan assembly defines a fan assembly axis B. The fan assembly 204 is positioned coaxially within the inlet housing 34 and outlet housing 38. The fan assembly illustrated in FIG. 5 can be positioned in the space occupied by the motor 126 and fan 78 of the construction illustrated in FIGS. 1-4 and can therefore occupy more axial space than the first construction.

An off-set motor assembly 236 including a motor 240, a drive shaft 244 whose longitudinal axis defines a motor axis C, and a belt 248. The motor axis C lies parallel with the fan assembly axis B, but the motor axis C is radially displaced from the fan assembly axis B. The belt 248 is coupled to the drive shaft 244 such that when the drive shaft 244 rotates the belt 248 rotates as well.

The first fan 208 of the dual-fan assembly 240 includes a plurality of first fan blades 252, a first fan wheel 256, and a first fan cavity 260 configured to couple to a first end of the spindle 216. The first fan wheel 256 has a recessed portion 264 on its perimeter surrounded on both longitudinal ends by raised edges 268. The recessed portion 264 is shaped so that the belt 248 can fit within the two raised edges 268. The raised edges 268 inhibit the belt 248 from slipping off of the first fan wheel 256.

The second fan 212 of the fan assembly 204 includes a plurality of second fan blades 272, a second fan wheel 276, and a second fan cavity 280 configured to couple to a second end of the spindle 216. The second fan 212 is spaced from the first fan 208 along the fan assembly axis B and is disposed at an opposite end of the spindle 216. Specifically, the second fan 212 is spaced from the first fan 208 in a direction toward an exhaust opening.

The belt 248 is coupled to the first fan wheel 256 such that when the belt 248 is rotated by the drive shaft 244, the belt 248 rotates the first fan wheel 256. In the illustrated construction, the belt 248 and the first fan wheel 256 are frictionally engaged. In other constructions, the belt 248 may have teeth which are shaped to fit in gaps of the first fan wheel 256. In yet other constructions, the belt 248 may be engaged in either fashion to the second fan wheel 276 or to both the first and the second fan wheel 256, 276. As one of ordinary skill will understand, other transmission systems could be employed that use belts or other drive members including but not limited to friction wheels, gears, chains, and the like. Thus, the invention should not be limited to a transmission between the motor and the fan that includes a single belt arranged as illustrated herein.

In the illustrated construction of FIG. 5, the belt 248 engages the drive shaft 244 and the first fan wheel 256 to produce a speed ratio that is less than one. In other words, the motor 236 operates at a rotational speed that is greater than the fan's rotational speed, thereby allowing both the fan 204 and the motor 236 to operate at optimum speeds. In other constructions, the speed ratio may be one or greater than one as required.

In addition to the dual fans 208, 212, the construction of FIG. 5 may also include stationary guide vanes positioned downstream of the fans 208, 212 similar to those of the construction of FIG. 2.

The handle assembly 314 is sized to cover the motor 236 and belt 248 and the opening through which the belt 248 passes to engage the first fan wheel 252. Thus, the moving parts of the axial blower vacuum 200 are enclosed in the various housings.

Figure 6:
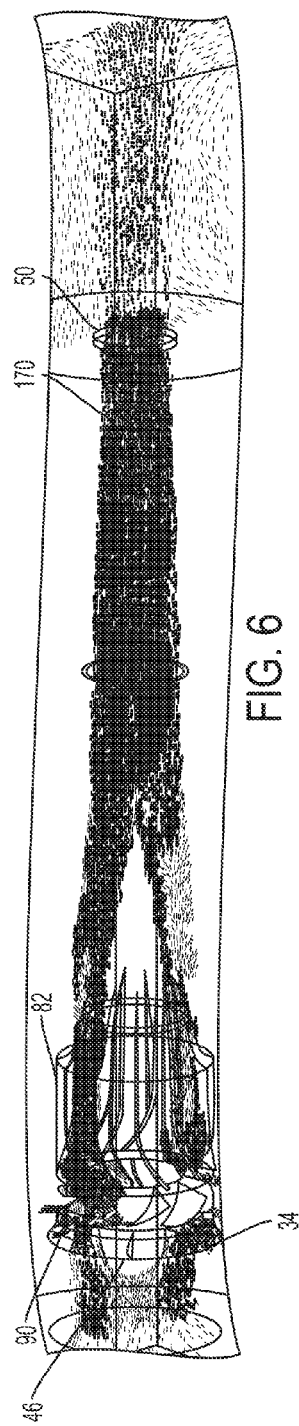
FIG. 6 is a side view of a forced air flow of the axial blower vacuum of FIG. 1.
Figure 7:
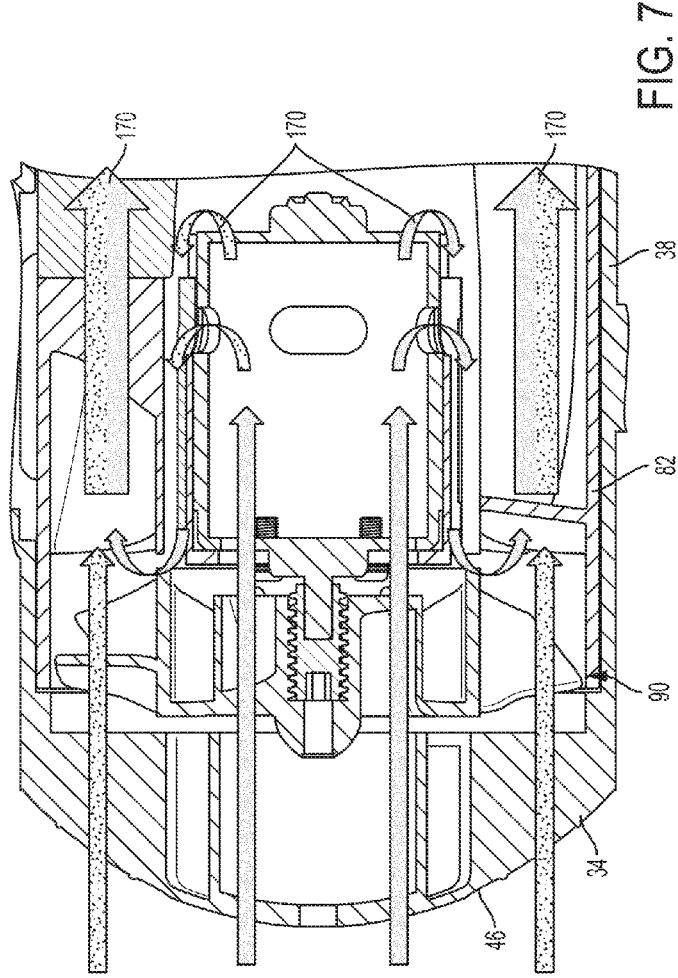
FIG. 7 is a side view of the forced air flow through the fan assembly of FIG. 3.

In operation of the first construction of the axial blower vacuum 10, a user positions their hand around the grip portion 66 with at least one finger extended over the trigger 74. When the user pulls the trigger 74, the motor 126 becomes energized which begins to rotate the drive shaft 134. The fan 90, coupled to the drive shaft 134, begins to create a low pressure zone on the interior of the inlet housing 34. Air 170 begins to flow through the inlet 46 and through the fan assembly 78, as shown in FIG. 6. Some of the air flow 170 travels over the plurality of interior fan blades 98 and into the motor 126 for cooling, as illustrated in FIG. 7. That air 170 is then sucked out of the motor 126 and joins with the primary air 170 that has passed through the exterior fan blades 94 nearer the exterior of the passageway 166. The air flow 170 continues into openings of the guide vane housing 82. The guide vanes 118 direct air toward the tail cone 86, which focuses the forced air 170 and directs it into the outlet housing 38. The inner diameter of the passageway 166 continues to decrease through the nozzle 42, further focusing the forced air 170 until it is expelled from the exhaust opening 50. To end the continued air flow 170, the user relaxes the trigger 74 which turns off the motor 126 and ceases rotation of the fan 90.

In operation of the vacuum function of the first construction, the flow of air is similar but reversed in order of contact. The fan 90 is forced to rotate in a direction opposite of the blowing operation. The fan 90 creates a low pressure region on the interior of the nozzle 42, forcing air 170 from the atmosphere into the blower vacuum assembly 18. The air 170 continues through the blower vacuum assembly 18 until the air 170 exits at the inlet 46.

Operation of the second construction is similar to that of the first construction. When the motor 240 is energized, the motor 240 rotates the drive shaft 244. The belt 248, being frictionally coupled to the drive shaft 244, rotates the first fan 208 as the belt 248 is turned. The second fan 212 rotates with the first fan 208 through rotation of the spindle 216. When blowing, the rotation of the fan assembly 204 creates a low-pressure region at the inlet of the blower vacuum assembly 220, forcing air from the atmosphere through the inlet and toward the fan assembly 204. The first fan blades 252 force air from the inlet side of the passageway toward the second fan blades 212, which continue to force the air toward the exhaust. The forced air continues through the blower vacuum assembly 220 and out the guide cone 232 where it is further focused to increase speed and direction. The axial blower vacuum 200 is assembled such that none of the motor assembly 236 lies in a forced air flow path. This configuration maximizes the speed at which the air can flow from the inlet to the exhaust. Similar to the first construction, the second construction can also reverse the direction of the air flow.

Thus, the invention provides, among other things, an axial blower vacuum with a motor radially off-set from fan assembly.

What is claimed is:

1. A blower vacuum comprising:
a housing including a wall that extends between a first opening and a second opening; a fan positioned at least partially within the housing and rotatable about a fan axis that extends between the first opening and the second opening;
a motor positioned outside of the housing and enclosed by a handle assembly having a radial opening, the fan and the motor being connected through the radial opening, the motor being rotatable about a motor axis that is parallel to and offset from the fan axis, the motor operable in a first direction to rotate the fan in a first direction to produce an air flow from the first opening to the second opening and operable in a second direction to rotate the fan in a second direction to produce an air flow from the second opening to the first opening;
and further comprising a transmission disposed between the motor and the fan and operable to transmit the rotation of the motor to rotation of the fan.

2. The blower vacuum of claim 1, wherein the transmission includes a belt that interconnects the motor and the fan, the belt passing through the radial opening.

3. The blower vacuum of claim 2, wherein the fan includes an outer hub having a recessed portion and two raised edges arranged to receive the belt.

4. The blower vacuum of claim 3, wherein the fan also includes fan blades, a center of the fan blades and a center of the outer hub intersecting a plane perpendicular to the fan axis.

5. The blower vacuum of claim 2, wherein the fan includes an outer hub arranged to receive the belt and having a hub diameter, and wherein the motor includes a drive member arranged to receive the belt and having a drive member diameter, and wherein the drive member diameter is smaller than the hub diameter such that the fan rotates at a speed that is slower than a speed of the motor.

6. The blower vacuum of claim 2, wherein the belt extends from inside of the housing to outside of the housing.

7. A blower vacuum comprising:
an elongated housing having an outer wall that extends between a first opening and a second opening, the outer wall defining a housing interior and a housing exterior;
a fan including a first stage and a second stage, the fan positioned at least partially within the housing interior and rotatable about a fan axis that extends between the first opening and the second opening;
a motor positioned in the housing exterior and enclosed by a handle assembly having a radial opening, the fan and the motor being connected through the radial opening, the motor being rotatable about a motor axis that is parallel to and offset from the fan axis, the motor operable in a first direction to rotate the fan in a first direction to produce an air flow from the first opening to the second opening and operable in a second direction to rotate the fan in a second direction to produce an air flow from the second opening to the first opening;
and further comprising a transmission disposed between the motor and the fan and operable to transmit the rotation of the motor to rotation of the fan.

8. The blower vacuum of claim 7, wherein the first stage and the second stage are mounted on a common shaft for co-rotation.

9. The blower vacuum of claim 7, wherein the transmission includes a belt that interconnects the motor and the fan, the belt passing through the radial opening.

10. The blower vacuum of claim 9, wherein the fan includes having a recessed portion and two raised edges arranged to receive the belt.

11. The blower vacuum of claim 10, wherein the fan also includes fan blades, a center of the fan blades and a center of the outer hub intersecting a plane perpendicular to the fan axis.

12. The blower vacuum of claim 9, wherein the fan includes an outer hub arranged to receive the belt and having a hub diameter, and wherein the motor includes a drive member arranged to receive the belt and having a drive member diameter, and wherein the drive member diameter is smaller than the hub diameter such that the fan rotates at a speed that is slower than a speed of the motor.

13. The blower vacuum of claim 9, wherein the belt extends from inside of the housing to outside of the housing.

* * * * *